July 15, 1952  G. H. KOCH  2,603,674
ELECTRIC MOTOR STRUCTURE
Filed Nov. 25, 1949  3 Sheets-Sheet 1

INVENTOR
Gustav H. Koch
BY R.J. Eisinger
ATTORNEY

July 15, 1952  G. H. KOCH  2,603,674
ELECTRIC MOTOR STRUCTURE
Filed Nov. 25, 1949  3 Sheets-Sheet 2

WITNESSES:
E. H. Lutz
V. W. Novak

INVENTOR
Gustav H. Koch
BY R. J. Eisinger
ATTORNEY

July 15, 1952  G. H. KOCH  2,603,674
ELECTRIC MOTOR STRUCTURE
Filed Nov. 25, 1949  3 Sheets-Sheet 3

WITNESSES:
E. H. Lutz
V. W. Novak

INVENTOR
Gustav H. Koch
BY P. J. Eisinger
ATTORNEY

Patented July 15, 1952

2,603,674

UNITED STATES PATENT OFFICE 2,603,674

ELECTRIC MOTOR STRUCTURE

Gustav H. Koch, Springfield, Mass., assignor to Westinghouse Electric Corporation, East Pittsburgh, Pa., a corporation of Pennsylvania Application November 25, 1950, Serial No. 197,527

4 Claims. (Cl. 171—252)

This invention relates to electric motors, and relates more particularly to motors of electric fans.

My Patent No. 2,464,816 discloses an electric motor which has a casing divided along an axial plane, the casing parts being provided with seats, the motor stator being placed in the seats of the lower casing part and clamped therein by the pressure exerted by the upper casing part which directly contacts the stator when the motor is assembled. In forming the laminations for such a stator, it is important that the circular hole for receiving the rotor be accurately located in relation to the lands which seat against the seating portions of the casing, in order to provide uniformity of the air gap between the rotor and the stator. In relatively small motors, such as the two-pole motor illustrated in said patent, this accuracy can easily be obtained by forming the entire lamination in one punching operation.

In larger motors, such as those having four poles, the lamination is so large that the circular hole for receiving the rotor and the seating lands cannot readily be formed in one punching operation, that is, in one station of the die, requiring that the rotor receiving hole be punched in one station of the follow die and the stator seating lands be formed in another station of the die. This introduces the possibility of improper location of the rotor receiving hole to the seating lands, with consequent non-uniformity of the air gap.

This invention provides an improved stator assembly for larger size motors, in which the stator is supported by pins the ends of which are seated in pin seats formed in the casing parts, and which extend through small holes in the stator which can be punched in the same operation or station of the die as the rotor receiving hole.

An object of the invention is to provide an improved stator support in an electric motor.

A more particular object is to provide a stator support which accurately locates the rotor receiving hole of the stator.

The invention will now be described with reference to the drawings, of which:

Figures 1, 2:
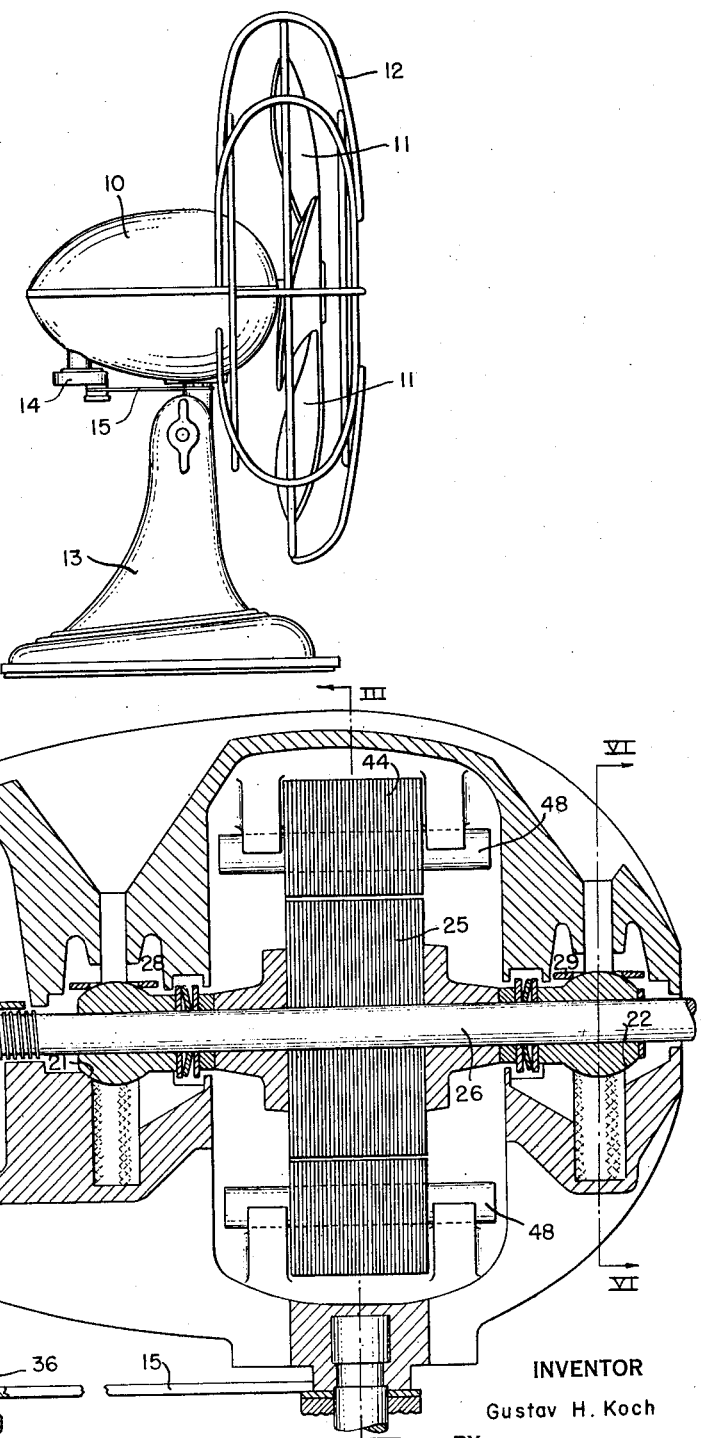
Fig. 1 is a side elevation of an electric fan having a motor embodying this invention.
Fig. 2 is a longitudinal, vertical section through the motor of Fig. 1.

The fan illustrated by Fig. 1 comprises an electric motor 10, fan blades 11 attached to the motor shaft, and a fan guard 12 around the blades. The motor 10 is supported upon the base 13, and is adapted to be oscillated thereon by the conventional oscillating mechanism 14 and the crank arm 15 attached thereto.

Figure 3:
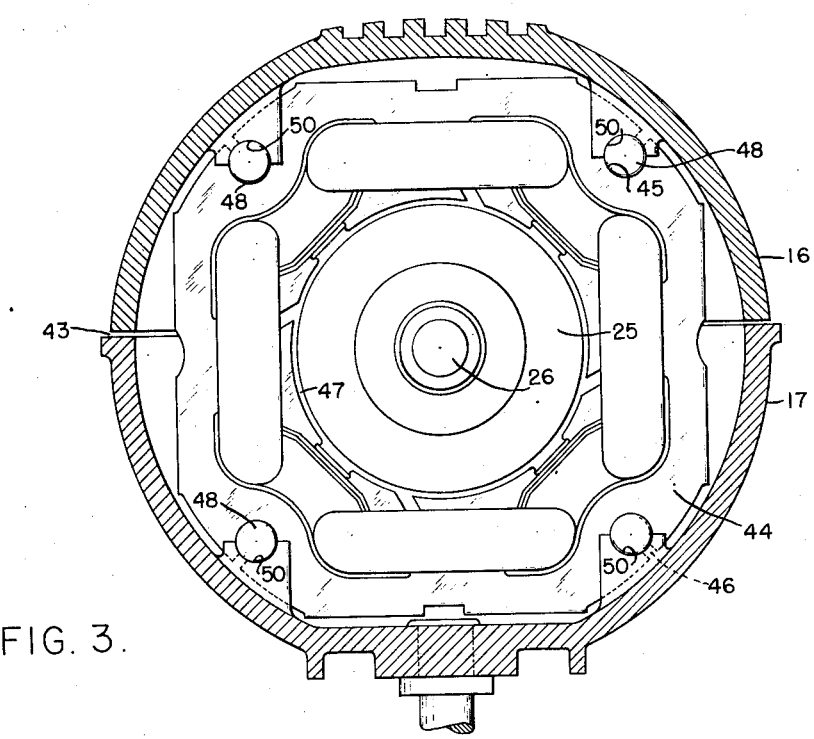
Fig. 3 is a sectional view along the line III—III of Fig. 2.
Figure 4:
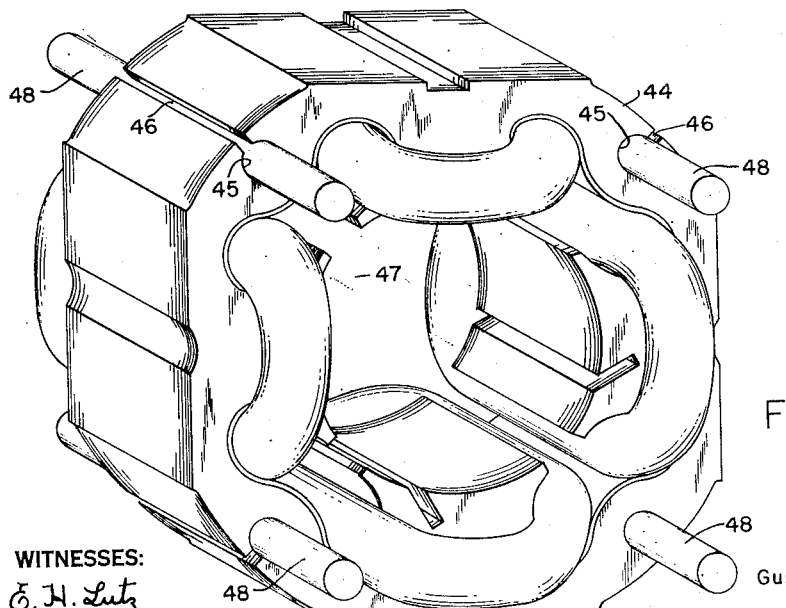
Fig. 4 is a perspective view of the motor stator and its supporting pins.
Figure 5:
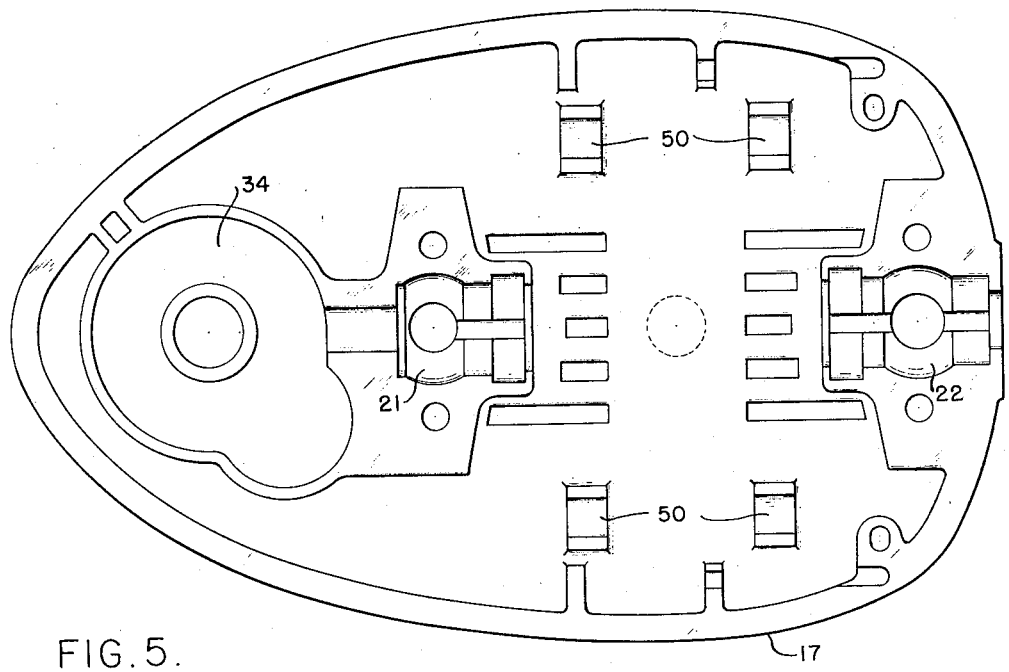
Fig. 5 is a plan view looking downwardly upon the lower part of the motor casing, with the motor and its components removed.
Figure 6:
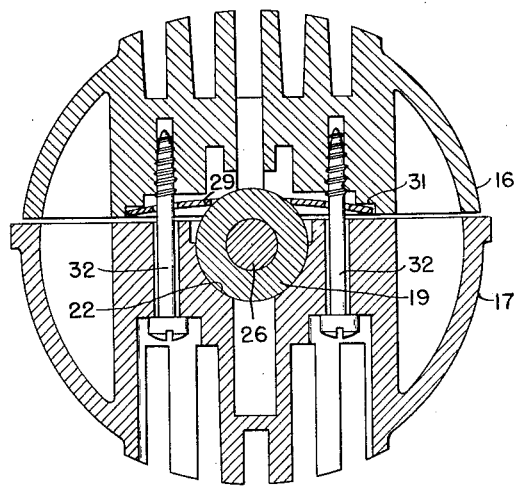
Fig. 6 is a sectional view along the line VI—VI of Fig. 2.

With reference to Figs. 2, 3 and 6, the casing of the motor of Fig. 1 is divided generally in a plane extending parallel to the axis of rotation of the fan motor, the plane of division in the embodiment illustrated being spaced slightly above the axis, the casing thus being divided into an upper casing part 16 and a lower casing part 17. Each of these casing parts is of such construction as to permit the casting of all interior surfaces as described in detail in said patent.

The bearings 18 and 19 of the motor shaft 26 are seated in the bearing seats 21 and 22 formed in the lower casing part 17. The motor rotor 25 is attached to the shaft 26 which is supported in the bearings 18 and 19 which are held firmly in their seats by the spring members 28 and 29 which extend over the bearings transversely of the motor. The spring members 28 and 29 normally are flat but are bowed as illustrated by Fig. 6 when the casing parts 16 and 17 are bolted together. At their intermediate portions, the spring members bear downwardly on the bearings. The downwardly facing shoulders 31 formed in the upper casing part 16, bear downwardly upon the outer ends of the spring members. The relative location of parts is such that the spring members are substantially deflected when the casing parts are bolted together so that the springs exert a substantial force pressing the bearings against their seats. The upper and lower casing parts are bolted together by the bolts 32, two of which are disposed on opposite sides of each of the bearings 18 and 19 as illustrated by Fig. 6.

The lower casing part 17 has the chamber 34 formed therein for the gearing of the oscillating mechanism, which includes a shaft 35 extending downwardly through the bottom of the casing and having a crank portion 36 attached to the connecting rod 15. The shaft 26 has a worm gear 37 formed on one end to drive the conventional gearing which, for simplicity of illustration, is not shown. The top of the chamber 34 is closed by the cover 38, which is held in place by the spring 39 mounted upon and carried by the projection 41 of the upper casing part 16.

The structure described in the foregoing in connection with Figs. 2, 3 and 6 is essentially that disclosed in my said application. The novel features of the present invention will now be described with reference to Figs. 2, 3, 4 and 5 of the drawing.

The laminated four-pole stator 44 has the four, equally spaced, circular openings 45 extending transversely therethrough adjacent its outer edges. The openings 45 extend parallel to the axis of rotation of the motor.

The openings 45 are relatively small so that, in forming the laminations, the openings 45 can readily be punched in the same operation, that is, in the same station of the follow die, as the circular opening 47 for the rotor. Thus, the openings 45 and the opening 47 are automatically maintained in accurately spaced relation to each other. Other edges of the laminations, such as the outer edges adjacent the openings 45 and the slots 46 which may be provided to interrupt the passage of secondary currents around the openings 45, may be formed in another station of the follow die and need not be formed as accurately.

The stator seating pins 48 extend through the openings 45 to a substantial distance on each side of the stator, and serve to secure the laminations of the stator together and to maintain them in alignment, thereby dispensing with the many rivets which ordinarily would be used to hold the laminations in place. The pins 48 also serve to support the stator in place in the casing parts 16 and 17 as will be described.

The casing parts 16 and 17 have formed therein the pin seats 50, two of which are formed on each side of the rotational axis of the motor, the pin seats on each side of the axis extending in alignment with axes which extend parallel to the rotational axis.

The ends of the stator seating pins 48 are seated in the pin seats 50 when the casing parts 16 and 17 are bolted together, and support the stator tightly in place. In order to provide alignment of the shaft 26 and the rotor 25 with the stator 44, the pin seats 50 and the bearing seats 21 and 22 in the lower casing part 17, are coined; that is, they are formed in a coining press after the casting part 17 is made. This, together with the fact that the openings 45 in the stator for the pins 48 and the opening 47 for the rotor are punched in one operation, provides accurate alignment of the rotor centrally in the stator.

Due to the pin seats 50 being located near the assembly bolts 32, less assembly strain is placed on the casing parts, resulting in improvement in the permanence of alignment.

In assembling the motor, the shaft, the bearings, the rotor and the stator with its assembled field windings, are placed in the lower casing part 17 with the bearings and the stator seating pins engaging their respective seats. The oscillating mechanism, including its gearing, is assembled, and the cover 38 is placed over the chamber 34. The spring members 28 are positioned over the bearings 18 and 19. The upper casing part 16 is then positioned over the lower casing part with the shoulders 31 resting upon the ends of the springs 28 and 29, and the spring 39 resting upon the gear chamber cover 38. The bolts 32 are then inserted and tightened to pull the upper casing part 16 downwardly until the pins 48 are seated in the pin seats 50 in the casing part 16. As the upper casing part is drawn downwardly, the shoulders 31 bear downwardly on the ends of the springs 28 and 29 and cause them to bow as shown by Fig. 6, and to exert downward pressures upon the bearings 18 and 19, holding them firmly against their seats.

The casing parts 16 and 17 are preferably formed so that when they are drawn together by the bolts 32 to the positions shown by Figs. 2 and 3, there will be a slight clearance between same as indicated at 43. This insures that, even with manufacturing tolerances or variations, it will always be possible to seat the upper pins 48 in their pin seats 50 in the upper casing part.

The stator and the bearings are thus held in alignment by the engagement of the lower stator seating pins with their pin seats in the lower casing part, and the engagement of the bearings with their seats in the lower casing part. The stator is held in position by the pin seats in the upper casing part pressing against the upper stator seating pins and thus forcing the lower stator seating pins against their seats in the lower casing part. The bearings are also held in position by the upper casing part by its pressure against the spring members 28 and 29 which force them against their seats.

It will thus be seen that I have provided a stator assembly in which the opening 47 for receiving the rotor is accurately located to provide uniform air gap, because the stator is located by the openings 45 which are formed simultaneously with the opening 47 and, therefore, in accurately spaced relation thereto. As will be noted from Fig. 3, the outer edges of the laminations are spaced from the inner surfaces of the casing parts, so that such edges need not be accurately located.

While the invention has been illustrated in but one form, it will be obvious to those skilled in the art that it is not so limited, but is susceptible of various changes and modifications without departure from the spirit thereof.

What is claimed is:

1. A motor comprising a rotor having an axis extending longitudinally of said motor, a stator core around said rotor, a casing divided into two longitudinally extending parts, said stator core having a plurality of spaced openings extending therethrough parallel to said axis, a plurality of pin seats in each of said casing parts extending parallel to said axis, and stator core seating pins extending through said openings into said seats.

2. A motor comprising a rotor having an axis extending longitudinally of said motor, a stator core around said rotor, a casing divided into two longitudinally extending parts, said stator core having two pairs of oppositely disposed openings extending therethrough parallel to said axis, each of said casing parts having two pairs of pin seats formed therein, the seats of each pair extending in alignment parallel to said axis, and stator core seating pins extending through said openings into said seats.

3. A motor comprising a rotor having a rotary shaft extending longitudinally of said motor, bearings on said shaft, a stator core around said rotor, said stator core having two pairs of oppositely disposed pins extending therefrom on both sides thereof, a casing around said stator core, said casing being divided into first and second longitudinally extending parts, the first of said parts having seats formed therein for said bearings and for the pins of one of said pairs, and means for securing said casing parts together, the second of said parts having seats formed therein for the pins of the other of said pairs.

4. A motor comprising a rotor having a rotary shaft extending longitudinally of said motor, bearings on said shaft, a stator core around said rotor, said stator core having two pairs of oppositely disposed openings extending therethrough parallel to said shaft, two pairs of stator core seating pins extending through said openings, a casing around said stator, said casing being divided into first and second longitudinally extending parts, the first of said parts having seats formed therein for said bearings and for the pins of one of said pairs, means for securing said parts together, the second of said parts having seats formed therein for the pins of the other of said pairs, and springs extending between said second casing part and said bearings for holding said bearings in said bearing seats.

GUSTAV H. KOCH.

REFERENCES CITED

The following references are of record in the file of this patent:

UNITED STATES PATENTS

| Number | Name | Date |
| --- | --- | --- |
| 2,120,427 | Kronmiller | June 14, 1938 |
| 2,349,401 | Beckwith | May 23, 1944 |
| 2,460,063 | Cole | Jan. 25, 1949 |
| 2,479,330 | Fagley | Aug. 16, 1949 |

FOREIGN PATENTS

| Number | Country | Date |
| --- | --- | --- |
| 60,436 | Netherlands | Jan. 15, 1948 |